(12) United States Patent
Karuppusamy et al.

(10) Patent No.: US 10,558,311 B2
(45) Date of Patent: Feb. 11, 2020

(54) REDUCTION OF NOISE IN TOUCH DATA SAMPLES VIA SAMPLING DURING PORCH TIME OF VSYNC AND HSYNC SIGNALS

(71) Applicant: STMicroelectronics Asia Pacific Pte Ltd, Singapore (SG)

(72) Inventors: Baranidharan Karuppusamy, Singapore (SG); Chaochao Zhang, Singapore (SG); Kusuma Adi Ningrat, Batam (ID)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/117,277

(22) Filed: Aug. 30, 2018

(65) Prior Publication Data

US 2018/0373364 A1  Dec. 27, 2018

Related U.S. Application Data

(63) Continuation of application No. 15/381,489, filed on Dec. 16, 2016, now Pat. No. 10,088,965.

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ...... G06F 3/044; G06F 3/0418; G06F 3/0412; G06F 3/041
See application file for complete search history.

(56) References Cited

U.S. PATENT DOCUMENTS

2016/0342262 A1* 11/2016 Qian ...................... G06F 3/0416
2017/0153736 A1*  6/2017 Kim ....................... G06F 3/0412

* cited by examiner

*Primary Examiner* — Lisa S Landis
(74) *Attorney, Agent, or Firm* — Crowe & Dunlevy

(57) ABSTRACT

Disclosed herein is a touch screen controller for controlling touch sensing in a touch screen display, the touch screen display having a display layer controlled as a function of horizontal sync and vertical sync signals and a capacitive touch array comprised of drive lines and sense lines. The touch screen controller includes a driver and control circuitry. The control circuitry is configured to cause the driver to generate a driving signal on the drive lines during assertion of the horizontal sync signal, and cause the driver to generate the driving signal on the drive lines during assertion of the vertical sync signal. Analog touch sensing circuitry is configured to generate analog touch data as a function of signals on the sense lines resulting from generation of the drive signal on the drive lines.

22 Claims, 13 Drawing Sheets

REDUCTION OF NOISE IN TOUCH DATA SAMPLES VIA SAMPLING DURING PORCH TIME OF VSYNC AND HSYNC SIGNALS

CROSS REFERENCE TO RELATED APPLICATION

This application is a continuation of U.S. application for patent Ser. No. 15/381,489 filed Dec. 16, 2016, the disclosure of which is incorporated by reference.

TECHNICAL FIELD

This disclosure is related to the field of touch screen displays, and more particularly to the reduction of display noise in touch data samples through sampling during the porch time (deasserted period) of vertical and horizontal synchronization signals of a touch screen display.

BACKGROUND

Handheld electronic devices such as smartphones, tablets, and smartwatches are popular with consumers and are sold in great numbers. The majority of these devices employ a touch sensitive display for both display of output to a user and accepting data as input from a user. Most of these touch sensitive displays utilize capacitive touch sensing.

A typical such touch sensitive display includes a display layer constructed from technology such as LCD, IPS, or AMOLED, as well as a sensing layer. A typical sensing layer includes a plurality of parallel drive lines, and a plurality of parallel sense lines. The sense lines capacitively intersect the drive lines. In operation, a single drive line is driven with a wave, such as a square wave or sine wave having a period of typically 2.5 µs. The capacitance between the sense lines and the driven drive line is sensed at the point where they intersect. Presence of a human finger or a conductive object alters the expected capacitance at the intersection point, and by measuring the change in capacitance, a touch between the finger or object and the touch sensitive display can be detected.

Consumer desires for these handheld electronic devices are for the devices to grow increasingly thin. This accordingly results in the desire to make touch sensitive displays increasingly thin. However, as such touch sensitive displays grow thinner, noise from the display layer becomes an increasing problem for the sensing layer, as the thinner designs result in greater parasitic capacitances coupling the noise from the display layer through to the sensing layer. This noise, when coupled through to the sensing layer, degrades accuracy of the touch sensing performed by the sensing layer, which is commercially undesirable.

One way to help avoid noise in touch sensing is to perform the touch sensing (sampling) at times during which less noise is present. However, since this involves a constraint on the length of time per second available for sampling, it can degrade touch sensing performance due to the fewer number of samples collected.

Therefore, noise reduction techniques which provide for collection of an increased number of samples are desirable.

SUMMARY

This summary is provided to introduce a selection of concepts that are further described below in the detailed description. This summary is not intended to identify key or essential features of the claimed subject.

Disclosed herein is a touch screen controller for controlling touch sensing in a touch screen display, the touch screen display having a display layer controlled as a function of horizontal sync and vertical sync signals and a capacitive touch array comprised of drive lines and sense lines. The touch screen controller includes a driver and control circuitry. The control circuitry is configured to cause the driver to generate a driving signal on the drive lines during assertion of the horizontal sync signal, and cause the driver to generate the driving signal on the drive lines during assertion of the vertical sync signal. Analog touch sensing circuitry is configured to generate analog touch data as a function of signals on the sense lines resulting from generation of the drive signal on the drive lines.

Also disclosed herein is a touch screen controller for controlling touch sensing in a touch screen display controlled as a function of horizontal sync and vertical sync. The touch screen controller includes a driver, and an OR gate receiving as input the horizontal and vertical sync signals and generating therefrom a vertical-horizontal sync signal as a function of a logical OR of the horizontal and vertical sync signals. Control circuitry is configured to cause the driver to generate a touch sensing driving signal a first number of times after detection of assertion of the vertical-horizontal sync signal, and cause the drive to generate the touch sensing driving signal a second number of times after generation of the touch sense driving signal the first number of times, based on lack of deassertion of the vertical-horizontal sync signal after generation of the touch sense driving signal the first number of times.

A method aspect disclosed herein includes generating a driving signal on drive lines of a capacitive touch array during assertion of a horizontal sync signal for a display and generating the driving signal on the drive lines during assertion of a vertical sync signal for the display. The method further includes generating analog touch data as a function of signals on sense lines of the capacitive touch array resulting from generation of the driving signal on the drive lines.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1A:
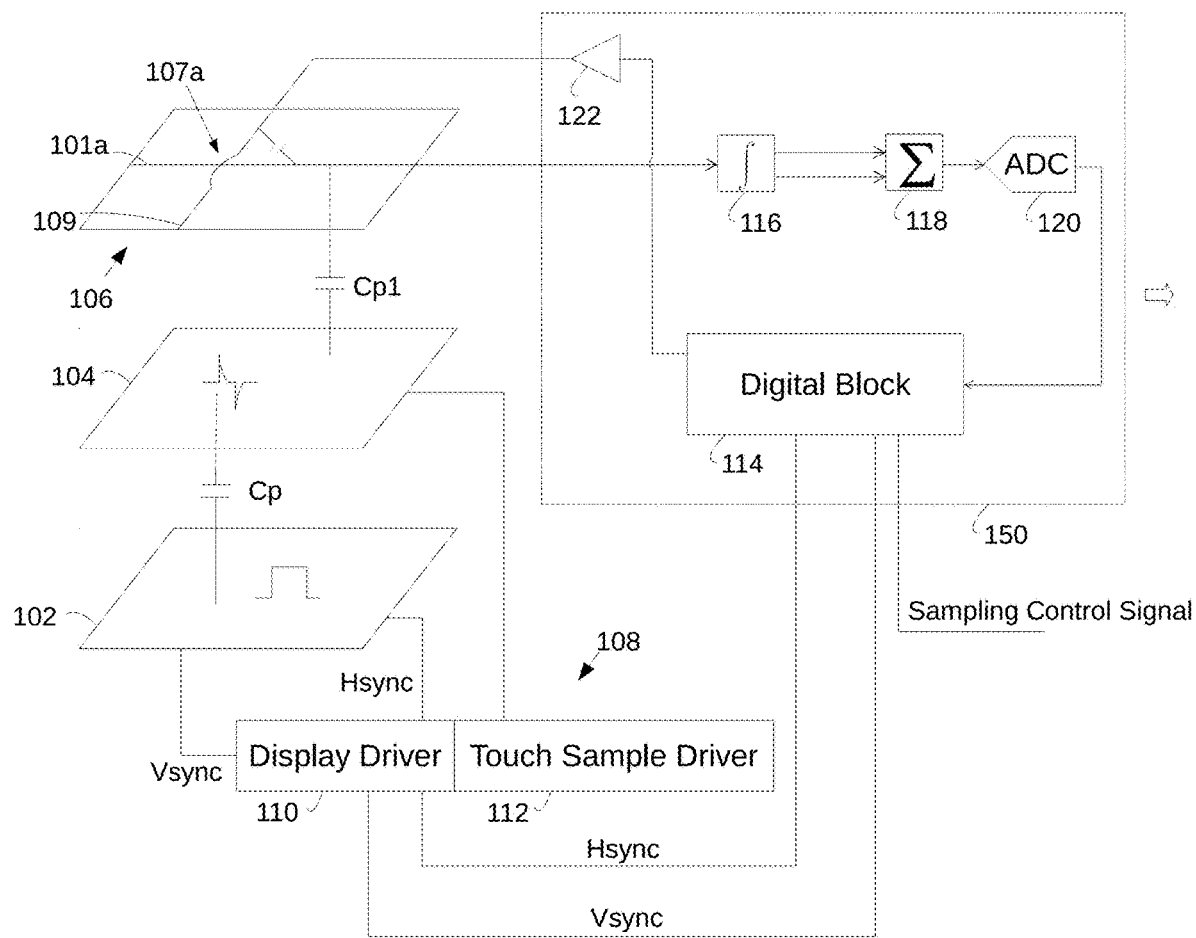
FIG. 1A is schematic block diagram of a touch screen in which display noise is coupled through to a plurality of sense lines, and in which the sampling and noise reduction techniques of this disclosure are performed by directly utilizing vertical synchronization and horizontal synchronization signals.

With initial reference to FIG. 1A, a touch sensitive display 100 for an electronic device is now described. The electronic device may be a smartphone, smartwatch, tablet, laptop, or other suitable portable electronic device. The touch sensitive display 100 includes a display layer 102 with a common voltage layer (VCOM) 104 thereon. A touch sensing layer 106 is over the VCOM layer 104.

Figure 2:
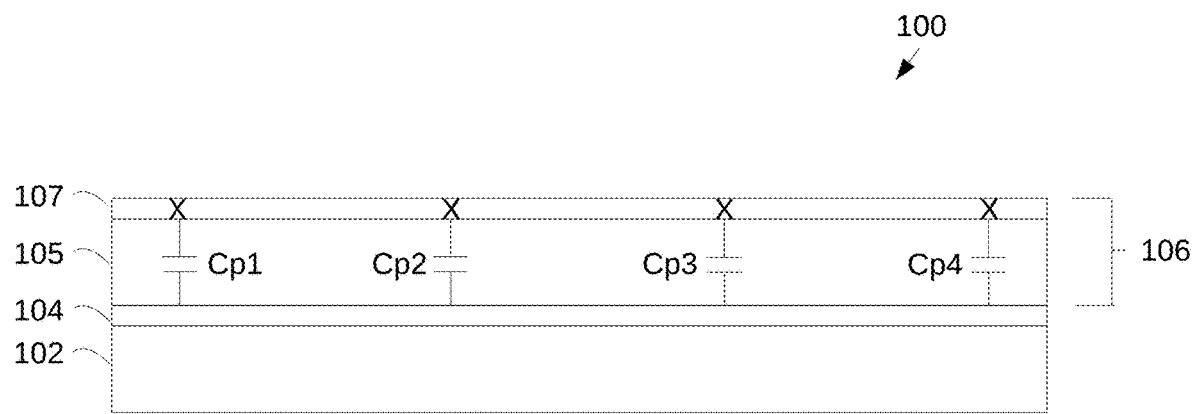
FIG. 2 is a schematic cross sectional diagram of the touch screen of FIG. 1 showing the arrangement of the display layer, VCOM layer, and sensing layer, as well as the parasitic capacitances coupling the display noise to the display layer.

As best shown in FIG. 2, the touch sensing layer 106 is comprised of a touch layer substrate 105 having a touch sensor 107 formed thereon. The touch sensor 107 itself is formed by capacitively intersecting sense line 101a and a drive line 109. Although the singular sense line 101a is shown for simplicity, there may be any number of such sense lines 101a-101n. Although one drive line 109 is shown for brevity, there may also be any number of such drive lines.

A touch is detected via measuring the capacitance between the sense line 101a and the drive line 109. The VCOM layer 104 provides a common voltage to all the pixels in the display array of display layer 102 and capacitively couples to the sensing layer 106. The common voltage is based upon a voltage reference Vcom.

Due to this VCOM layer 104, as will be explained in detail below, parasitic capacitances Cp1-Cpn are formed between the sensing layer 106 and the VCOM layer 104, and a parasitic capacitance Cp is formed between the VCOM layer 104 and the display layer 102. There may be any number of parasitic capacitances formed between the sensing layer 106 and the VCOM layer 104, and between the VCOM layer 104 and the display layer 102.

The display layer 102 contains rows and columns of pixels that are scanned so as to form an image for display to a user. The display layer 102 is coupled to a display driver 110 which controls the display layer 102 using a horizontal sync signal Hsync and a vertical sync signal Vsync. Hsync is a signal that synchronizes the start of scanning of display rows, and Vsync is a signal that synchronizes the start of display of a new frame.

In operation, the drive line 109 is driven with a periodic signal, such as a square wave. At the intersection point between the drive line 109 and sense line 101a, the sense line 101a incurs a charge injection proportional to the voltage at the drive line 109 and a capacitance between the sense line 101a and the drive line 109 at that intersection point. This capacitance varies in proximity to conductive objects, such as human fingers, and is measured and processed by a touch screen controller (TSC) 150 so as to generate touch data for use by the electronic device.

The touch screen controller 150 includes a driver 122 coupled to the drive line 109 and controlled by a drive (or "force") signal Tx from the digital block 114. The sense line 101a is coupled to an integrator 116. The integrator 116 is coupled to an accumulator 118. The accumulator 118 is coupled to an analog to digital converter 120, which in turn is coupled to the digital block 114.

Generation of the touch data will now be described. The drive line 109 is driven with a periodic signal by the driver 122, under control of the digital block 114. At the intersection point between the drive line 109 and sense line 101a, the sense line 101a incurs a charge injection proportional to the voltage at the drive line 109 and a capacitance between the sense line 101a and the drive line 109 at that intersection point. The integrator 116 integrates the signal on the sense line 109. The accumulator 118 sums the signals received from the integrator 116, and passes the sum to the analog to digital converter 120. The analog to digital converter 120 converts the sum to the digital domain and passes it to the digital block 114. The digital block 114 processes the sum to produce touch data, which it outputs.

The inventors have found that, at each Hsync pulse and at each Vsync pulse, noise is capacitively coupled from the display layer 102 into the VCOM layer 104 via the parasitic capacitance Cp. Then, that noise is capacitively coupled from the VCOM layer 104 into the sensing layer 106 via the parasitic capacitance Cp1. This noise causes unwanted charge injection which would degrade the accuracy and performance of the touch data generated by the touch screen controller 150.

Figure 1B:
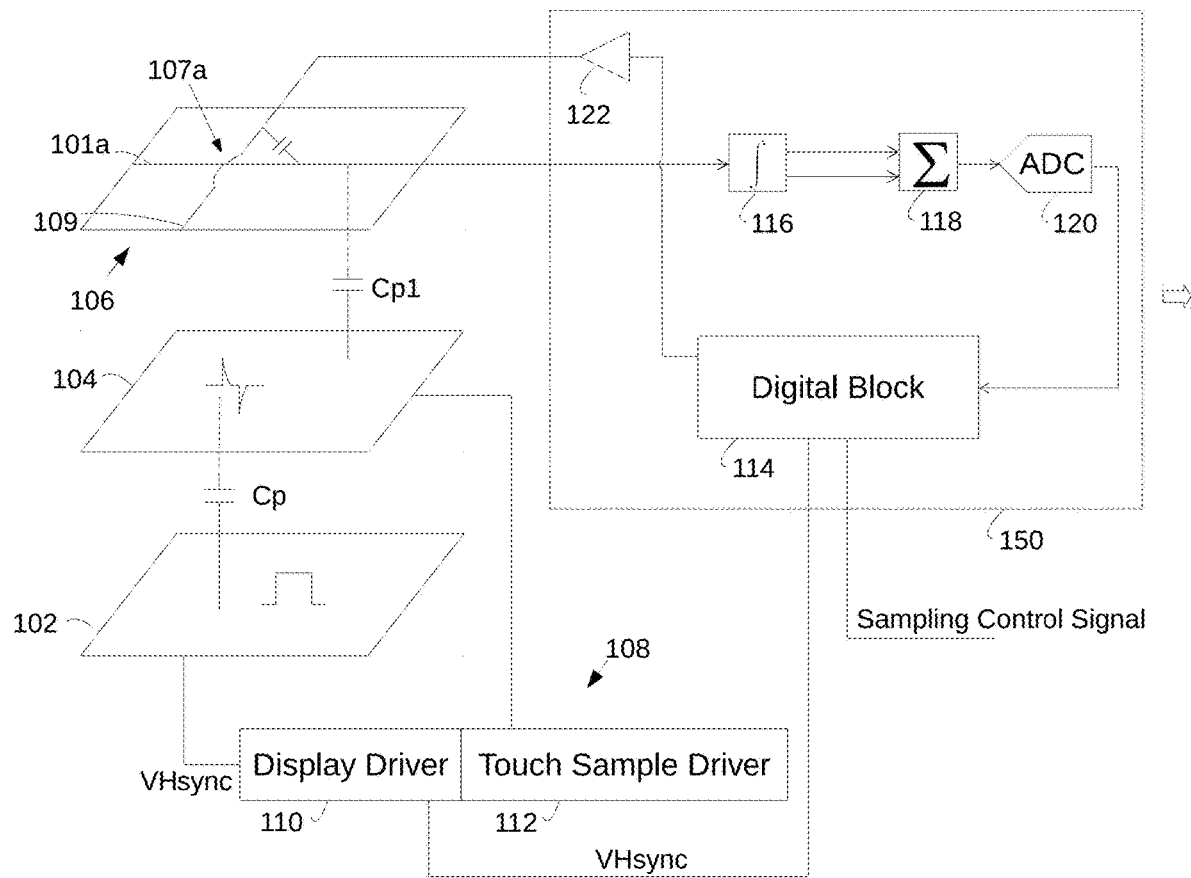
FIG. 1B is schematic block diagram of a touch screen in which display noise is coupled through to a plurality of sense lines, and in which the sampling and noise reduction techniques of this disclosure are performed by directly utilizing a combined vertical-horizontal synchronization signal.
Figure 1C:
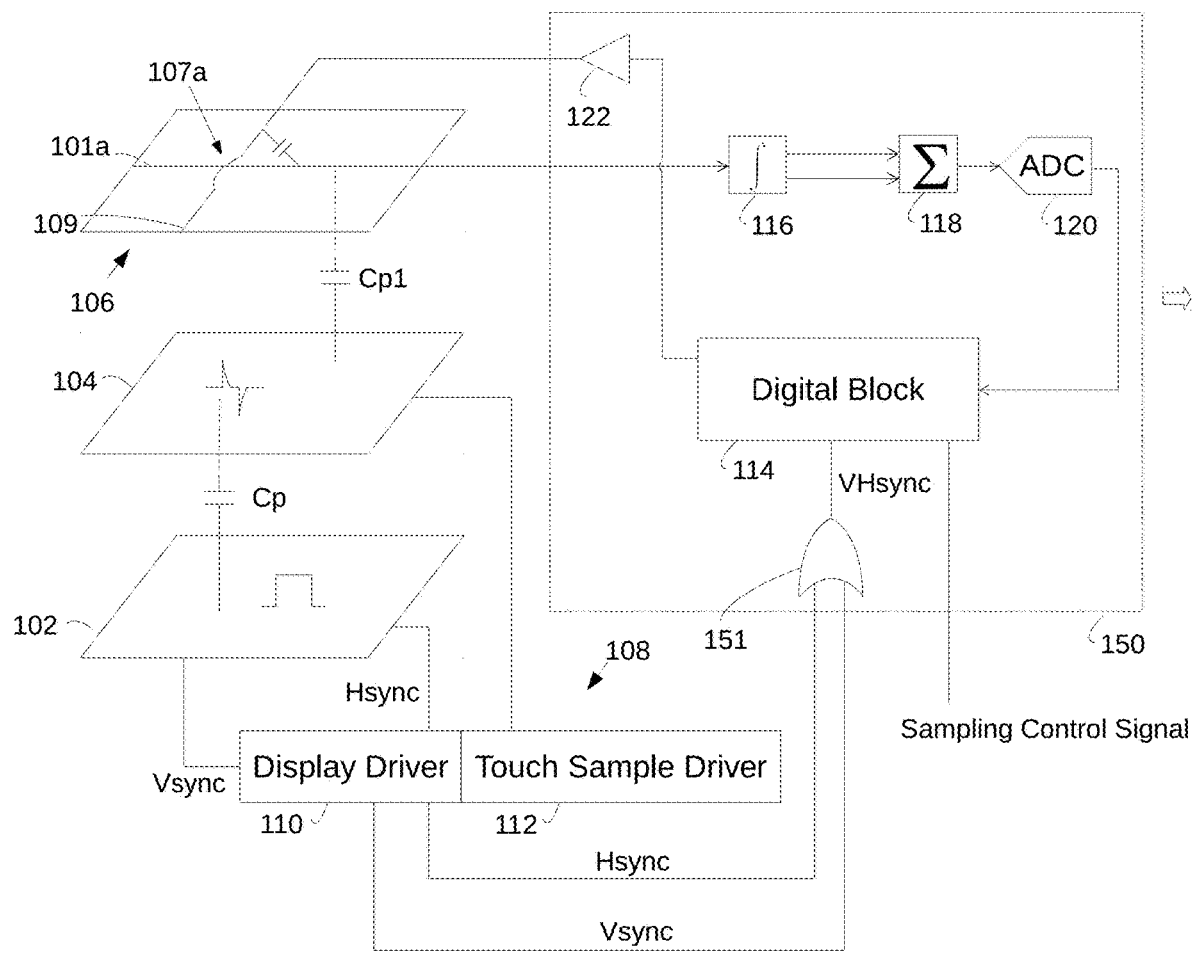
FIG. 1C is schematic block diagram of a touch screen in which display noise is coupled through to a plurality of sense lines, and in which the sampling and noise reduction techniques of this disclosure are performed by utilizing a combined vertical-horizontal synchronization signal generated from the vertical and horizontal synchronization signals.
Figure 3:
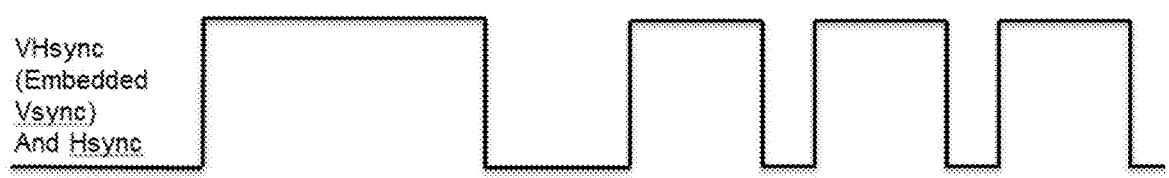
FIG. 3 is a graph showing the combined vertical-horizontal synchronization signal.

In some cases, the display layer 102 may operate not based on separate Vsync and Hsync signals, but on a combined VHsync signal, as shown in the circuit of FIG. 1B, and as shown in the sample signal shown in the graph of FIG. 3.

Figure 4:
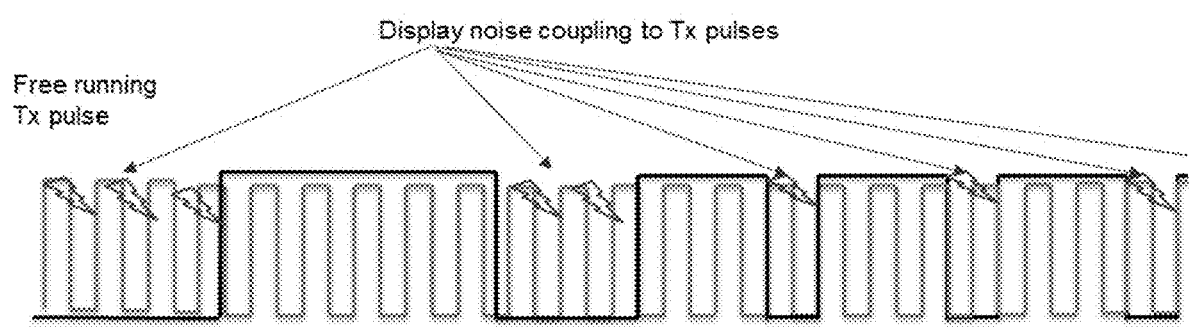
FIG. 4 is a graph showing the coupling of display noise when sampling is performed continuously in a free running fashion.

The display noise is greatest during the time at which the display layer 102 is driven, and the display layer 102 is not driven during assertion of the Vsync and Hsync signals (or assertion of the VHsync signal). Therefore, if the drive line 109 was continually driven by the driver 122 during deassertion of the Vsync and Hsync (or VHsync) signals, as shown in FIG. 4 in which the drive signal is referred to as Tx pulses, and sampling was performed, some samples would be taken during periods of high noise. This would yield undesirable results.

Figure 5:
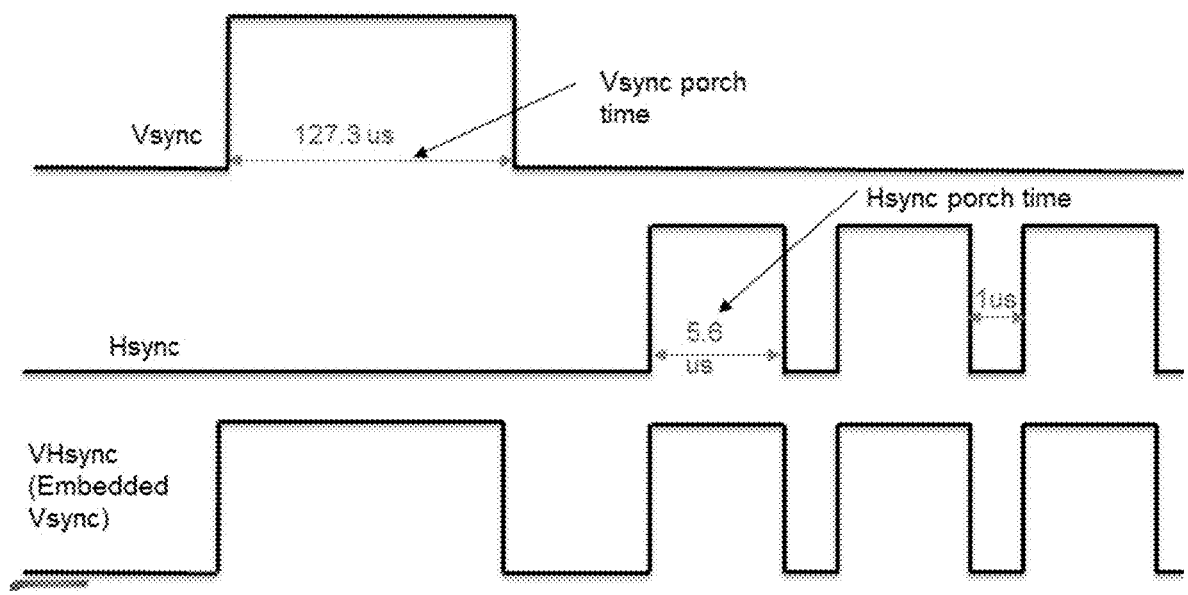
FIG. 5 is a graph showing the "porch" time of vertical synchronization, horizontal synchronization, and combined vertical-horizontal synchronization signals.

Therefore, it is desirable to sample during times when the Vsync and Hsync signals (or VHsync signal) are asserted. These periods of time can be referred to as "porch time", and are illustrated in the graphs of FIG. 5.

Figure 6:
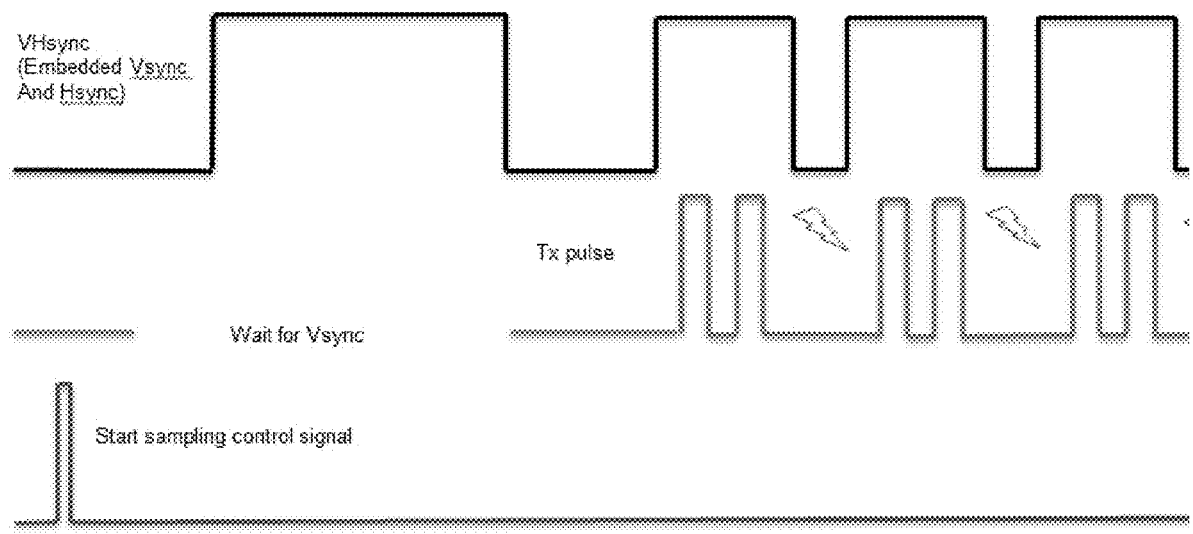
FIG. 6 is a graph showing a sampling technique for sampling touch signals during the "porch" time of horizontal synchronization signals.

As shown in FIG. 6, one method by which to sample touch data is by the digital block 114 causing the driver 122 to drive the drive line 109 during the Hsync porch time.

Under this mode of operation, when the digital block 114 detects assertion of a start sampling control signal, such as from a system-on-a-chip of the electronic device, the digital block 114 waits for receipt of the next Vsync pulse, and then effectuates sampling during the Hsync porch times following the assertion of that Vsync pulse, stopping sampling after the last Hsync porch time prior to receipt of the next Vsync pulse. Sampling is, as explained, effectuated by causing the driver 122 to drive the drive line 109.

Figure 12:
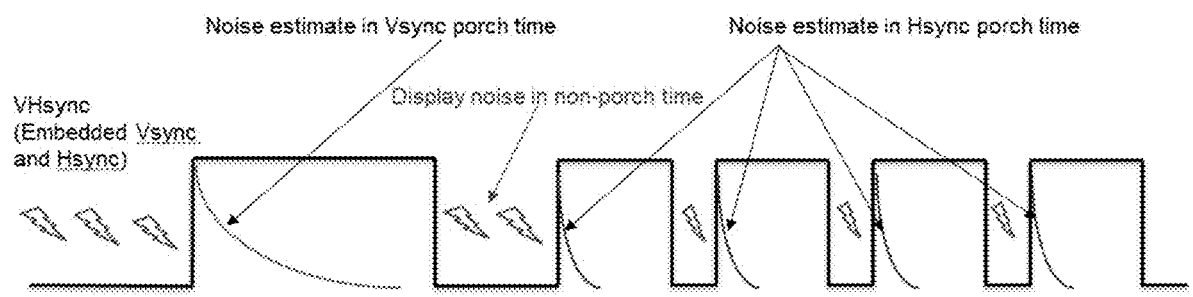
FIG. 12 is a graph showing noise estimates during vertical synchronization and horizontal synchronization porch times.

This mode of operation has the advantage of not sampling during particularly noisy periods, although some residual noise is still present on the sense line 101a at the beginning of the Hsync porch time, as shown in FIG. 12. It should be noticed that the residual display noise present during the start of the Vsync porch time is different than the residual display noise present during the start of the Hsync porch time, for example decaying at a lesser rate than the residual noise present during the start of the Hsync porch time. Due to this difference, and due to the fact that it may in some cases be simpler to perform noise reduction in the analog domain, this mode of operation does not sample (i.e. generate Tx pulses) during the Vsync porch time.

Figure 7:
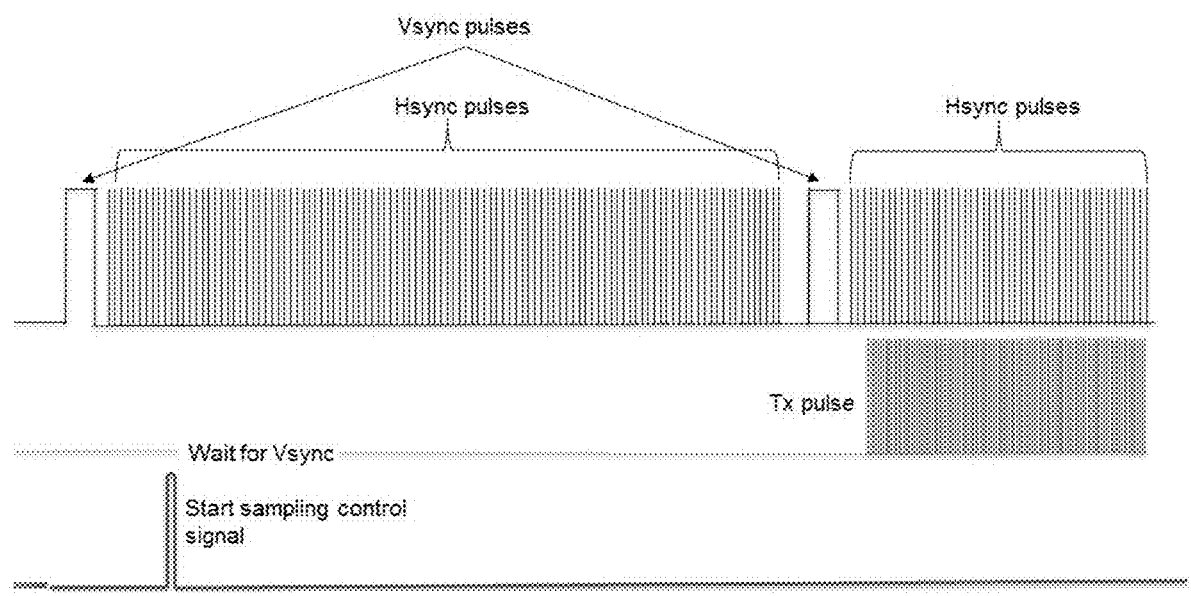
FIG. 7 is a graph showing drawbacks of the sampling technique illustrated in FIG. 6.

While this is a simple implementation, the drawback of this mode of operation is shown in FIG. 7. Here, the start sampling control signal is not asserted until after the first Vsync pulse, and therefore the digital block 114 waits for the next Vsync pulse to begin sampling during Hsync porch time. As shown, this results in a substantial delay time before sampling begins, and the collection of fewer data points. This can ultimately result in dissatisfactory user interface performance of the electronic device.

Figure 8:
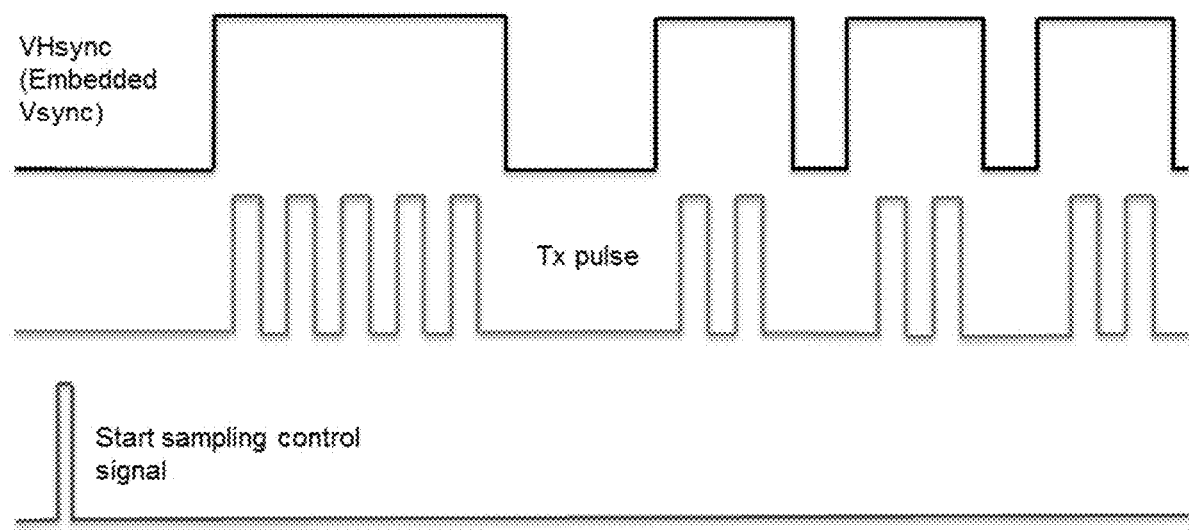
FIG. 8 is a graph showing a sampling technique for sampling touch signals during the "porch" time of both vertical and horizontal synchronization signals.
Figure 9:
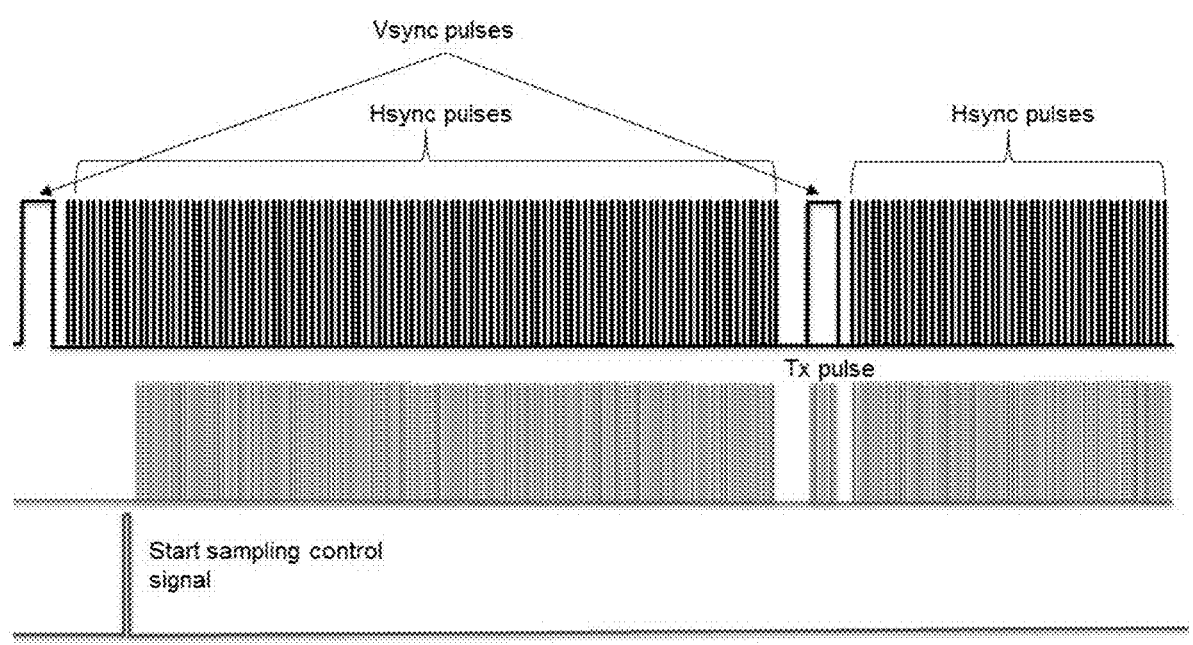
FIG. 9 is a graph showing how the sampling technique of FIG. 8 addresses the drawbacks of the sampling technique of FIG. 6 shown in FIG. 7.
Figure 10:
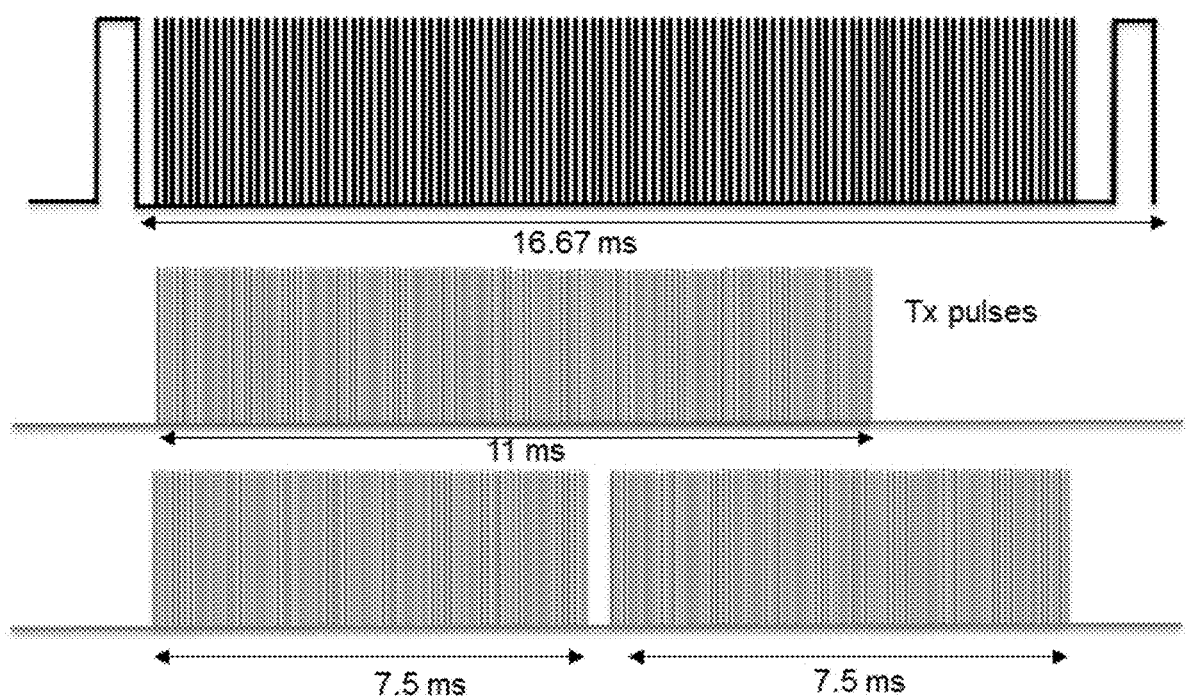
FIG. 10 is a graph showing further disadvantages of the sampling technique of FIG. 6.

Therefore, as shown in FIG. 8, another mode of operation is where the digital block 114 waits for either the next Vsync or the next Hsync pulse, and begins sampling thereafter by causing the driver 122 to drive the drive line 109 with the Tx pulses. As shown in FIG. 9 in which the start sampling control signal is not asserted until after the first Vsync pulse, this mode of operation greatly reduces the delay time as compared to sampling during Hsync porch time but not Vsync porch time.

One way in which to manage the residual display noise present at the start of the Vsync and Hsync porch times is to delay sampling (i.e. delay driving of the drive line 109 by the driver 122) a given period of time after the beginning of the porch times. Since the residual display noise may be present longer during the Vsync porch time than during the Hsync porch time, the sampling delay before beginning sampling during the Vsync porch time may be greater than the sampling delay before beginning sampling during the Hsync porch time. In some cases, the delay may be equal, however.

Additional noise reduction may be performed in the digital domain by the digital block 114. Thus, in some cases, no other analog noise reduction save for the above described sampling delays after the start of Vsync and Hsync porch times is used, with all other noise reduction being performed in the digital domain by the digital block 114. In other cases, some or all other noise reduction may instead be performed in the analog domain prior to conversion to the digital domain.

The above mode of operation may be performed by the touch sensitive display 100 shown in FIG. 1A, in which Vsync and Hsync are separate signals, and in which the digital block 114 receives those Vsync and Hsync signals and operates based thereupon.

However, as shown in the various graphs shown in FIGS. 3-12, the digital block 114 may operate based on a combined VHsync signal instead. This VHsync signal may be directly received from the display driver 110 as shown in FIG. 1B, or it may be generated based on a logical OR of Vsync and Hsync by OR gate 151.

In the case where the digital block 114 operates based on the combined VHsync signal, the Vsync and Hsync pulses may have different durations, with for example, the Vsync pulse having a greater duration than the Hsync pulse. Here, the digital block 114 may operate by causing the driver 122 to generate a first number of Tx pulses (for example, two) after a transition of VHsync from deasserted to asserted. If, after that first number of Tx pulses is generated, a transition of VHsync from asserted to deasserted is not received, the digital block 114 causes the driver 122 to generate a second number of Tx pulses (for example, three) such that the total number of desired pulses during Vsync porch time have been generated. For example, there may be five samples in total counting the first number of Tx pulses and second number of Tx pulses.

As shown in FIG. 5, for a 1920×2560 display resolution, the duration of a Vsync pulse may be approximately 127.3 µs and the duration of a Hsync pulse may be 5.6 µs, with 2560 Hsync pulses between two Vsync pulses. Thus, in this example, the Vsync porch time is 127.3 µs, while the Hsync porch time is 5.6 µs. The Vsync pulses are 16.67 ms apart at this resolution, for example.

Figure 11:
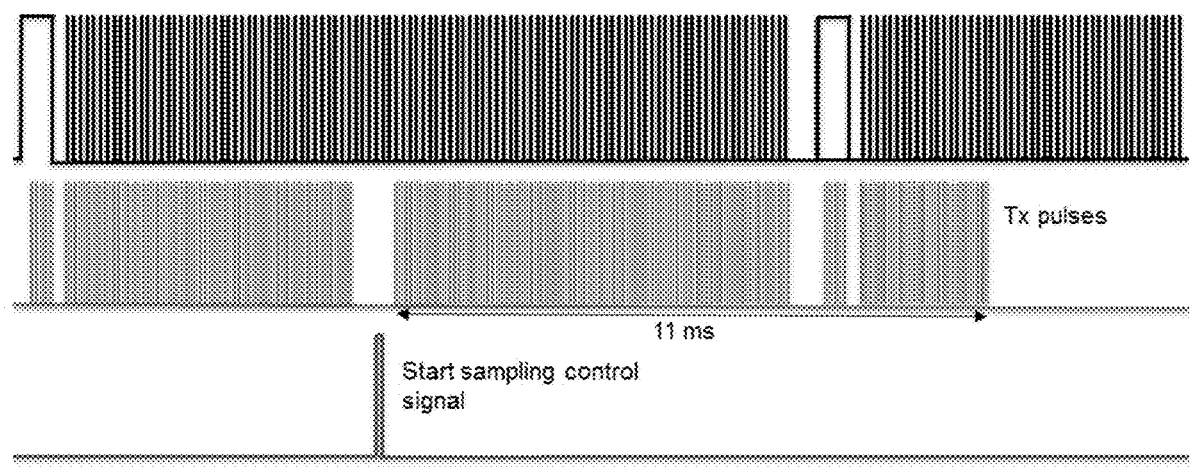
FIG. 11 is a graph showing how the sampling technique of FIG. 8 addresses the drawbacks of the sampling technique of FIG. 6 shown in FIG. 10.

As shown in FIG. 11, a typical sampling length (duration of time in which the driver 122 generates the Tx pulses) is around 11 ms. Thus, if sampling were performed during Hsync porch time but not Vsync porch time, one full sampling every 16.67 ms would be performed. This would constrain sampling to 60 Hz. To enable sampling at 90 Hz, two sampling periods of 7.5 ms may be performed. However, this reduces signal to noise ratio (SNR) due to the lesser number of samples per sampling period. By sampling during both the Vsync porch time and the Hsync porch time, an 11 ms sampling period may be performed without regard to the location of the next Vsync pulse. Thus, sampling frequency is not constrained, and the effect on SNR is lessened.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A touch screen controller for use in a touch screen display, the touch screen display having a display layer controlled as a function of a synchronization signal and a capacitive touch array comprised of drive lines and sense lines, the touch screen controller comprising:
   a driver;
   control circuitry configured to respond to assertion of a start sampling control signal by causing the driver to begin generating a driving signal comprising a series of pulses on the drive lines at a next assertion of the synchronization signal; and
   touch sensing circuitry configured to generate touch data as a function of signals present on the sense lines due to the driving signal generated by the driver on the drive lines.

2. The touch screen controller of claim 1, wherein the synchronization signal is a horizontal sync signal.

3. The touch screen controller of claim 1, wherein the synchronization signal is a vertical sync signal.

4. The touch screen controller of claim 1, wherein the synchronization signal is a vertical-horizontal sync signal.

5. The touch screen controller of claim 1, further comprising an analog to digital converter configured to convert the touch data to digital touch data, and to perform noise reduction on the digital touch data.

6. A touch screen controller for use in a touch screen display, the touch screen display having a display layer controlled as a function of a first and second synchronization signals and a capacitive touch array comprised of drive lines and sense lines, the touch screen controller comprising:
   a driver connected to the drive lines;
   control circuitry configured to respond to assertion of a start sampling control signal by causing the driver to begin generating a driving signal comprising a series of pulses on the drive lines at assertion of a next synchronization, wherein assertion of the next synchronization assertion occurs at one of a next rising edge of the first synchronization signal and a next rising edge of the second synchronization signal, whichever occurs first; and
   touch sensing circuitry configured to generate touch data as a function of signals present on the sense lines due to the driving signal generated by the driver on the drive lines.

7. The touch screen controller of claim 6, wherein the first synchronization signal is a horizontal sync signal and the second synchronization signal is a vertical sync signal.

8. The touch screen controller of claim 6, wherein if the next rising edge of the first synchronization signal occurs before the next rising edge of the second synchronization signal, the series of pulses of the driving signal are generated so as to occur during assertions of the first synchronization signal.

9. The touch screen controller of claim 6, wherein if the next rising edge of the second synchronization signal occurs before the next rising edge of the first synchronization signal, the series of pulses of the driving signal are generated so as to occur during assertions of the second synchronization signal.

10. The touch screen controller of claim 6, wherein the series of pulses of the driving signal are generated so as to occur during assertions of the first and second synchronization signals; and wherein the control circuitry is configured to only generate the series of pulses of the driving signal during a period beginning a first wait time after start of assertion of the second synchronization signal and ending at end of assertion of the second synchronization signal as well as during a period beginning a second wait time after start of assertion of the first synchronization signal and ending at end of assertion of the first synchronization signal.

11. The touch screen controller of claim 10, wherein the first and second wait times are unequal.

12. The touch screen controller of claim 10, wherein the first wait time is longer than the second wait time.

13. The touch screen controller of claim 6, wherein the first and second synchronization signals are components of a combined vertical-horizontal sync signal.

14. The touch screen controller of claim 13, wherein the series of pulses of the driving signal are generated so as to occur during assertions of the first and second synchronization signals; wherein the control circuitry causes the driver to generate the series of pulses of the driving signal on the drive lines during assertion of the first synchronization signal by generating a first set number of pulses during assertion of the combined vertical-horizontal sync signal; and wherein the control circuitry causes the driver to generate the series of pulses of the driving signal on the drive lines during assertion of the second synchronization signal by generating a second set number of pulses based on lack of deassertion of the vertical-horizontal sync signal after generating the first set number of pulses.

15. A method, comprising:
   waiting for assertion of a start sampling control signal;
   in response to assertion of the start sampling control signal, waiting for a next assertion of one of a horizontal synchronization signal and a vertical synchronization signal from a touch screen display, whichever occurs first; and
   in response to the next assertion, causing a driver to generate a driving signal on drive lines of the touch screen display during assertions of the horizontal synchronization signal and the vertical synchronization signal.

16. The method of claim 15, wherein the driving signal is generated on the drive lines during a period beginning a first wait time after start of assertion of the vertical sync signal and ending at end of assertion of the vertical sync signal; and wherein the driving signal is generated on the drive lines during a period beginning a second wait time after start of assertion of the horizontal sync signal and ending at end of assertion of the horizontal sync signal.

17. The method of claim 16, wherein the first wait time is longer than the second wait time.

18. A method, comprising:
   waiting for assertion of a start sampling control signal;
   in response to assertion of the start sampling control signal, waiting for a next synchronization assertion from a touch screen display; and
   in response to the next synchronization assertion, causing a driver to generate a driving signal on drive lines of the touch screen display.

19. The method of claim 18, wherein the next synchronization assertion is a next assertion of a horizontal sync signal.

20. The method of claim 18, wherein the next synchronization assertion is a next assertion of a vertical sync signal.

21. The method of claim 18, further comprising generating touch data as a function of signals on sense lines of the touch screen display resulting from generation of the driving signal on the drive lines.

22. The method of claim 21, further comprising converting the touch data to digital touch data, and performing noise reduction on the digital touch data.

* * * * *